E. W. COLE.
PLANTER.
APPLICATION FILED JULY 16, 1919.
1,339,688.
Patented May 11, 1920.
2 SHEETS—SHEET 2.
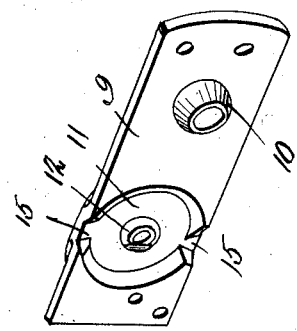
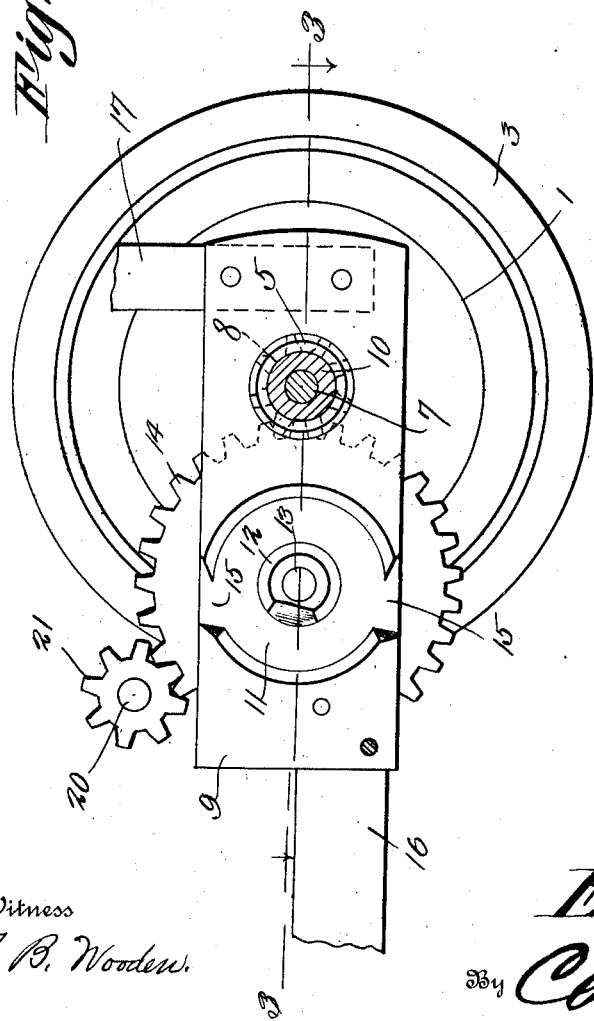
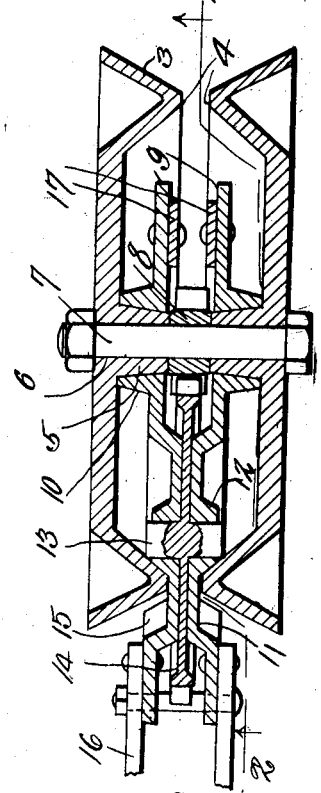
Inventor
E. W. Cole
By C. A. Snow & Co.
Attorneys.
Witness
F. B. Wooden.

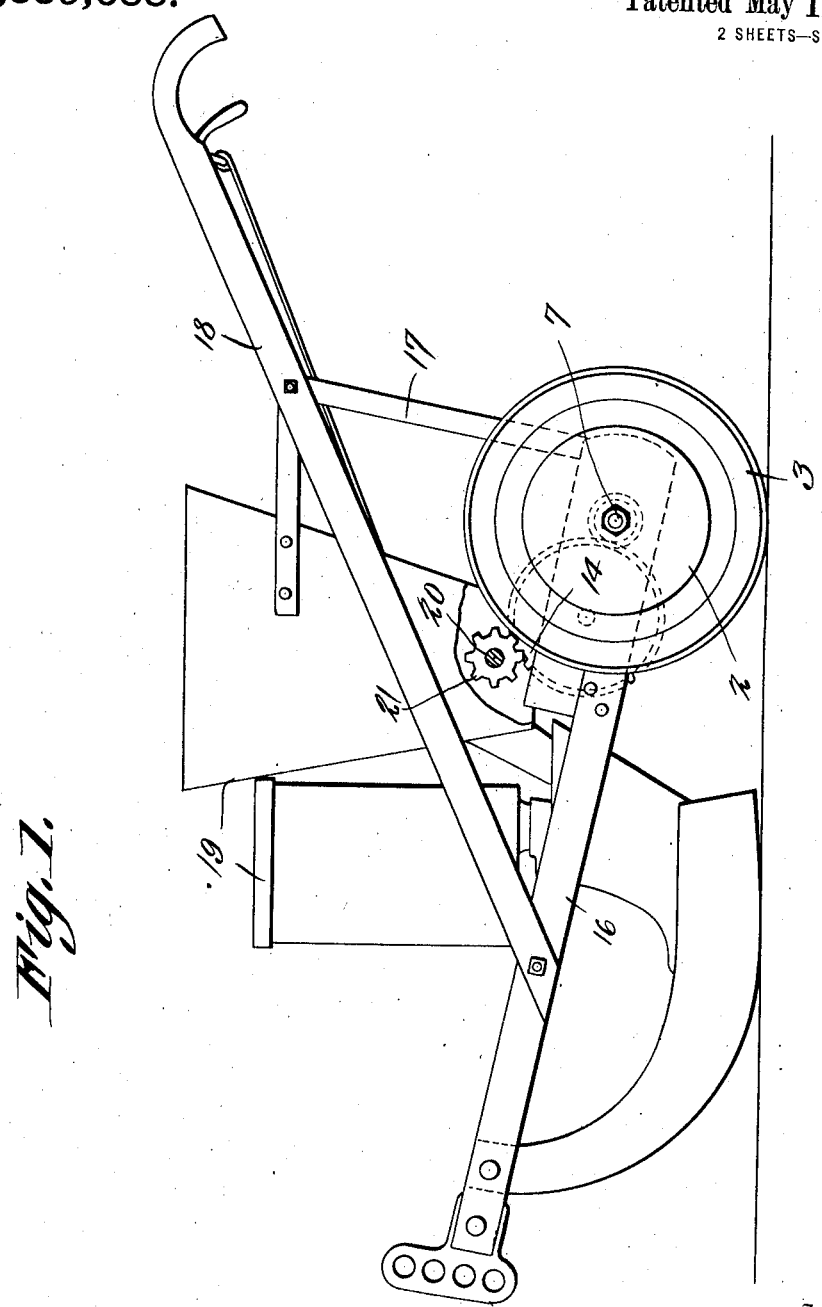

UNITED STATES PATENT OFFICE.

ELISHA W. COLE, OF CHARLOTTE, NORTH CAROLINA.

PLANTER.

1,339,688.  Specification of Letters Patent.  Patented May 11, 1920.

Application filed July 16, 1919. Serial No. 311,324.

*To all whom it may concern:*

Be it known that I, ELISHA WORTH COLE, a citizen of the United States, residing at Charlotte, in the county of Mecklenburg and State of North Carolina, have invented a new and useful Planter, of which the following is a specification.

This invention relates to planters, one of its objects being to provide a very compact and efficient planter formed of few parts which can be shipped in a knocked down condition at the minimum expense, and subsequently set up quickly without requiring the services of an expert.

Another object is to provide a planter which is cheap to manufacture and which can be used in connection with various kinds of seed dropping mechanisms.

A further object is to provide a structure especially suited for use in connection with double hoppers for planting two crops simultaneously.

With the foregoing and other objects in view which will appear as the description proceeds, the invention consists of certain novel details of construction and combinations of parts which will be hereinafter more fully described and pointed out in the claims.

In the accompanying drawings the preferred form of the invention has been shown.

In said drawings

Figure 1 is a side elevation of a planter having the present improvements.

Fig. 2 is a vertical longitudinal section taken between the members of the wheel.

Fig. 3 is a section on line 3—3, Fig. 2.

Fig. 4 is a perspective view of one of the connecting plates.

Referring to the figures by characters of reference, 1 and 2 designate wheel members each in the form of a disk provided at its periphery with a V-shaped flange 3, the apexes of the flanges extending beyond the inner sides of the members as shown at 4. A tapered boss 5 is provided on the inner side of each member at the center thereof, said boss being tapered as shown. Openings 6 extend through the bosses 5 for the reception of an axle 7 in the form of a strong bolt which extends through the members 1 and 2 as shown. Mounted on this axle and clamped tightly between the bosses 5 so as to rotate therewith is the hub of a small gear 8 which constitutes means for holding the members 1 and 2 properly spaced apart.

Mounted on each of the bosses 5 is a connecting plate 9 having an outwardly extending boss 10 provided with a tapered bore into which one of the bosses 5 extends. The two plates are oppositely disposed and have inwardly offset circular portions 11 provided with central outwardly extending bosses 12. Journaled in these bosses are trunnions 13 of a gear 14 and the offset portions 11 of the plates fit close to the web of this gear, as shown in Fig. 3 and are concentric with the gear. Gear 14 meshes with the gear 8 and the rim of the gear is of a width substantially equal to the combined widths of the gear web and the inner portions of the two offsets 11. Thus the space between the flanges 3 need be only minutely greater than the width of the rim of the gear 14 and, in order to accommodate the said flanges 3, the offsets 11 are provided with upper and lower extensions or channels 15 into which the flanges project. See Figs. 2, 3 and 4.

As shown in Fig. 1 the front ends of the plates 9 can be connected to the frame 16 of a planter and the rear ends of said plates can likewise be connected by straps 17 to the handles 18 of the planter. The hopper or hoppers have been indicated at 19 and the dropping mechanism is provided with the usual shaft 20 for operating it. A gear 21 is secured to this shaft and meshes with the gear.

From the foregoing it will be apparent that the structure is rendered very compact, the two members 1 and 2 being spaced apart only a sufficient distance to receive the gear 14 therebetween and the plates 9 being so shaped that they too can be extended between the members 1 and 2 without increasing this space. The parts can be knocked down simply by removing the axle or bolt 7 and thus releasing all of the parts. Likewise the parts can be easily assembled without requiring the services of an expert, as will be apparent. By shipping the structure in a knocked down condition a considerable saving of freight is effected, and by arranging the parts as shown and described the cost of production is greatly reduced because of the reduction in the amount of material required.

What is claimed is:—

1. In a planter spaced wheel members having inwardly extending peripheral flanges, a gear clamped between said members, a connecting plate supported between the members and extending between the flanges, a gear journaled on said plate and meshing with the clamped gear, said gear upon the plate extending between the flanges and being of a thickness at its periphery slightly less that the width of the space between the flanges.

2. In a planter spaced wheel members having angular flanges at their peripheries, a gear therebetween, an axle detachably mounted in the wheel members and gear for binding them together, connecting plates extending between and supported by the wheel members at opposite sides of the gear, a power transmitting gear journaled between the plates and meshing with the clamped gear, said plates and power transmitting gear extending outwardly between the wheel members and the space between said members at the peripheries being less than the combined thicknesses of the connecting plates and the rim of the power transmitting gear.

3. In a planter spaced wheel members having inwardly extending angular flanges spaced apart and central inwardly extending bosses, a gear interposed between the bosses, an axle extending through the gear and bosses for binding them together, connecting plates supported by the bosses, a large gear journaled between said plates and extending with the plates through the space between the flanges, said space being narrower than the combined thicknesses of the plates and the rim portion of the large gear.

4. In a planter spaced wheel members having angular peripheral flanges extending toward each other and central inwardly extending bosses, a gear secured between and revoluble with the wheel members, connecting plates supported by said members at opposite sides of the gear, a large gear projecting between the flanges and having its rim portion wider than its web portion, said gears meshing, said connecting plates having inwardly offset portions extending up to the web of the large gear, there being channels extending into the said offset portions from the opposite edges of the plates, the flanges of the wheel members projecting into the channels and offset portions, said large gear being carried by the connecting plates.

5. The combination with spaced wheel members having peripheral flanges extending toward each other and forming an annular slot therebetween, and inwardly extending central bosses upon the members, of a gear interposed between the bosses, and a combined axle and tie bolt extending through the bosses and gear for binding them together.

6. The combination with spaced wheel members having peripheral angular flanges extending inwardly toward each other and forming an annular slot therebetween, and central bosses extending inwardly from said members, of a gear interposed between the bosses, means extending through the bosses and gear for binding them together, plates journaled on the bosses at the sides of the gear, and a larger gear carried by and between the plates and meshing with the first named gear.

In testimony that I claim the foregoing as my own, I have hereto affixed my signature in the presence of two witnesses.

ELISHA W. COLE.

Witnesses:
 HERBERT D. LAWSON,
 I. E. SIMPSON.